United States Patent Office 3,420,904
Patented Jan. 7, 1969

3,420,904
PROCESS FOR OLIGOMERIZING A CONJUGATED ALIPHATIC DIOLEFIN AND ETHYLENE
Langley R. Hellwig, Trenton, N.J., assignor to Columbian Carbon Company, New York, N.Y., a corporation of Delaware
No Drawing. Filed May 23, 1966, Ser. No. 551,943
U.S. Cl. 260—666           21 Claims
Int. Cl. C07c 3/20; C07f 15/04

ABSTRACT OF THE DISCLOSURE

Processes are described for the oligomerization of a conjugated aliphatic diolefin by contacting a liquid admixture of the diolefin and ethylene with a nickel coordination catalyst. Illustrations show the formation of 1,5-cyclodecadiene and 1,4,9-decatriene from a liquid admixture of 1,3-butadiene and ethylene in the presence of either a preformed Lewis base complex of nickel (0) or such complex which is formed in situ by reducing a nickel compound in the presence of a molecular Lewis base.

---

Numerous processes for the homo-oligomerization of conjugated aliphatic diolefins, such as 1,3-butadiene, have been described in the prior art. These known processes include an essentially thermal process, as well as a variety of catalytic processes which utilize a Group VIII metal coordination catalyst. These processes are applicable to the cyclic dimerization, trimerization, or tetramerization of a conjugated diolefin, such as 1,3-butadiene or a substituted butadiene, to yield, as the predominant product, a cycloolefin or a mixture of cycloolefins having from six to about twenty cyclic carbon atoms. Among the products recovered and identified from such reactions are vinyl cyclohexene, cyclooctadiene, cyclododecatriene and cyclohexadecatetraene. Particularly, suitable coordination catalysts that have been described in the prior art are nickel complexes with carbon monoxide or a molecular organic Lewis base in which the formal valence of nickel is less than that of nickel in its lowest normal oxidation state; i.e. less than +2. Typical of such complexes are the nickel (0) carbonyls and complexes of nickel (0) with higher cycloaliphatic multiolefins, such as cyclododecatriene, or esters of trivalent Group V–A elements having an atomic weight of from about 30 to about 209. Such complexes have been utilized either alone, as in United States Patents 3,004,081, 3,187,062 and 3,243,468, or in combination with a reducing agent, as in U.S. Patents 3,247,270 and 3,249,641.

In addition, compositions containing nickel complexes which are suitable for oligomerizing 1,3-butadiene have been produced by the reduction of various nickel (II) and nickel (III) compounds in the presence of amines, esters or trivalent phosphorus, arsenic or antimony, or aliphatic multiolefins, such as cyclopentadiene, cyclooctadiene and cyclododecatriene, as well as 1,3-butadiene itself. The preparation of such suitable nickel complexes from compounds in which nickel is present in a normal oxidation state is shown in U.S. applications S.N. 202,406 and S.N. 129,968.

Although the nickel coordination catalysts described in the prior art are well known and have been used for many years in the production of cycloolefins containing 6, 8 and 12 cyclic carbon atoms, all attempts to utilize these catalysts to produce a 10 member ring by the homooligomerization of a conjugated aliphatic diolefin have been unsuccessful.

It is an object of this invention to provide a simple process for producing cooligomers of a conjugated aliphatic diolefin and ethylene. It is a further object of this invention to provide a process for effecting the cooligomerization of two moles of a conjugated aliphatic diolefin with one mole of ethylene. Still another object of this invention is to provide a means for producing cyclic diolefins containing 10 cyclic carbon atoms and acyclic triolefins. A more specific object of this invention is to provide a process for effecting the cooligomerization of two moles of 1,3-butadiene and one mole of ethylene to produce 1,5-cyclodecadiene, which can readily be hydrogenated and then oxidized to sebacic acid in accordance with known procedures. Further objects will be apparent to those skilled in the art from a consideration of the following description of this invention.

It has now been found that, under the conditions set forth below in detail, a conjugated aliphatic diolefin, such as 1,3-butadiene, can be cooligomerized with ethylene by contacting a liquid admixture of these monomers with one or more of the Group VIII metal coordination catalysts which are taught by the prior art to be effective in catalyzing the homooligomerization of butadiene. As in the case of butadiene homooligomerization, the preferred catalysts for use in the process of the instant invention are the nickel complexes with carbon monoxide or a molecular organic Lewis base in which the formal valence of nickel is less than +2, and preferably 0.

Although the precise mechanism involved in the catalytic homooligomerization of conjugated aliphatic diolefins has not been precisely determined, it has been proposed that the active catalyst species in all the prior art systems is a transitory complex of the conjugated aliphatic diolefin and zero valent nickel. It further has been suggested that such complexes result either from the displacement by the conjugated aliphatic diolefin of other Lewis bases that are coordinatively bonded to nickel (0) or from the coordination of such conjugated diolefin with nickel which has been activated by a reduction of the valence state to a valence of less than +2. It has further been postulated that the presence of Lewis acid reducing agent, which is a stronger electron acceptor than nickel, facilitates such replacement or complexing by itself complexing preferentially with such other Lewis bases, including anions, which may be present in the system, thereby reducing their affinity for nickel. Although the invention set forth herein is not to be interpreted in light of this theory, it is quite useful in explaining the similar results obtained by the use of apparently dissimilar nickel sources in the instant cooligomerization reactions, as well as in the prior art homooligomerizations. In addition, this theory offers a pragmatic explanation for the observed fact that the addition of a Lewis acid reducing agent has little effect with certain nickel sources and is essential for the practical utilization of others. For example, the addition of a Lewis acid reducing agent to a nickel (0) complex having ligands which are easily replaced by butadiene, such as bis (cyclooctadiene) nickel or tetrakis (triphenylphosphite) nickel, has little, if any, effect on the reaction rate or product selectivity. On the other hand, in the absence of a Ziegler type activator, low temperature homooligomerization or cooligomerization of butadiene proceeds at a low rate with a nickel (0) complex in which the ligands are tightly bound, and does not occur at all when the nickel has a formal valence of +2 or +3, as in bis (triphenylphosphine) nickel dibromide or (tetraphenylcyclobutadiene) nickel dibromide.

Although the process of the instant invention is similar in many respects to the homooligomerization processes of the prior art, it has been found that the presence of both monomers in a liquid or fluid phase in the reaction system is essential for significant yields of cooligomer product. For example, when a mixture of 1,3-butadiene and ethylene in a molar ratio of 2:1 is bubbled through a toluene solution of a nickel coordination complex, such as bis (triphenyl arsine) nickel dicarbonyl, at a temperature of 100° C. at atmospheric pressure, unreacted ethylene can be recovered almost quantitatively and the oligomer product is essentially the same as that which would be obtained in the absence of ethyene. On the other hand, when this reaction is conducted under a pressure of 400 p.s.i.g., ethylene solubility in the liquid benezene/butadiene solution is significantly increased, thereby facilitating the production of cooligomers. Many of the advantages of the instant process can be realized by operating with a solvent under slightly elevated pressures which, although insufficient to liquify the diolefin, increases the solubility of gaseous diolefin and ethylene in the solvent; however, it has been found that, under such moderate pressures, a large excess of the more reactive diolefin is present in the liquid phase, thereby favoring the formation of homooligomers. A preferred embodiment of this invention involves the use of pressures sufficiently high to liquify a portion of the diolefin component. Under such circumstances, the ethylene solubility in the liquid phase (diolefin or diolefin and solvent) is greatly increased, as is the yield of cooligomer. The minimum total pressure necessary to liquify a portion of the diolefin component at a given temperature is, of course, a value which continuously changes with the variations in concentration of the materials in the reaction system which exert a significant partial pressure; including both monomers, reaction products and such inert solvents and gases as may be present. In general, the preferred mode of operation can be achieved by conducting the oligomerization under a total pressure that is in excess of the vapor pressure of the pure diolefin at reaction temperature. When 1,3-butadiene is used as the diolefin component in a reaction conducted in benzene at very low temperatures, for example 15° C., the ethylene concentration in the liquid phase increases significantly as the reactor pressure is raised above about 30 p.s.i.a. Similar effects can be noted at reaction temperatures of 40° C. and 80° C. as the pressure is raised above about 65 p.s.i.a. and about 150 p.s.i.a., respectively. High concentrations of ethylene in the liquid phase and outstanding results can be obtained by utilizing total reactor pressures which are at least about 30 p.s.i. and preferably at least about 100 p.s.i. higher than the vapor pressure of the pure diolefin.

The reaction of the instant invention can be conducted over wide temperature range. Cooligomers of butadiene and ethylene may be obtained at temperatures below 0° C. and above 150° C.; however, it is seldom necessary or desirable to utilize temperatures outside a preferred range of from about 30° C. to about 130° C. Reactions conducted at temperatures below this range are generally quite slow, while those conducted above this range may exceed the pseudo critical temperature of the reaction mixture and thereby diminish the yield of the desired cooligomer product. An especially preferred operating range is from about 40° C. to about 100 C. at pressures from about 100 p.s.i.a to about 2000 p.s.i.a. or higher and preferably from about 300 p.s.i.a. to about 700 p.s.i.a. In general, operating temperatures below about 80° C. favor the formation of cyclic diene cooligomers containing 10 cyclic carbon atoms, whereas temperatures above about 80° C. tend to yield a cooligomer product that predominates in acyclic multiolefinic cooligomers. Prolonged exposure of the cyclodecadiene products, and particularly 1,5-cyclodecadiene, to temperatures above about 80° C. also leads to ring collapse whereby these cooligomers are converted to divinylcyclohexanes.

The conjugated aliphatic diolefins that are useful in the process of this invention are 1,3-butadiene and hydrocarbyl or halogenated derivatives thereof which contain up to nine carbon atoms, and preferably from four to six carbon atoms. Examples of such diolefins include 1,3-butadiene, 2,3-dimethyl-1,3-butadiene, 1,3-pentadiene, 1,3-hexadiene, 4-methyl-1,3-hexadiene, 2,4-octadiene, 2-chloro-1,3-butadiene and 2,3-dichloro-1,3-butadiene. The preferred diolefins are 1,3-butadiene and 2-methyl-1,3-butadiene (isoprene).

The nickel (0) coordination complexes which may be used in the process of this invention are compositions in which nickel, having a formal valence of less than 2 and preferably 0, is coordinatively bonded to one or more molecules of carbon monoxide or an organic Lewis base (electron pair donor); i.e. an organic molecule having at least one pair of electrons available for sharing with nickel. Such organic Lewis base molecules are well known and include organic derivatives of trivalent Group V–A elements, as well as ethylenically and acetylenically unsaturated hydrocarbons.

Typical of such molecules are the amines, such as trimethylamine, triphenylamine and pyrrolidine; triorgano derivatives of phosphorus, such as triphenyl phosphine and tri(2-ethylhexyl) phosphite; analogous organo compounds of arsenic, antimony and bismuth, such as, triphenyl arsine and triphenyl antimonite; and cyclic multiolefins, such as, cyclopentadiene, cyclooctadiene, cyclodecadiene and cyclododecatriene.

A preferred class of nickel coordination complexes that are useful in the process of the instant invention includes those complexes which are stable at room temperature and atmospheric pressure and can therefore be readily introduced into the reaction system as discrete compositions. The use of such stable complexes obviates the necessity for pressure storage vessels and facilitates close control of the concentration of complex nickel in the reaction system. The preferred complexes of this group can be represented by the empirical formula

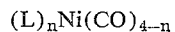

$(L)_n Ni(CO)_{4-n}$ wherein L is an ester of a trivalent Group V–A element having an atomic weight of from about 30 to about 209, preferably from about 30 to about 122, and $n$ is an integer from 0 to 4 inclusive. Representative complexes of this group are nickel tetracarbonyl, triphenyl phosphite nickel tricarbonyl, triethyl phosphine nickel tricarbonyl, bis(triphenyl phosphite) nickel dicarbonyl, bis(triphenyl arsine) nickel dicarbonyl, bis(tricyclohexyl antimonite) nickel dicarbonyl, tris(triphenyl phosphite) nickel carbonyl, tris(triphenyl phosphine) nickel carbonyl, tetrakis (triphenyl phosphite) nickel, bis (triphenyl phosphite)-bis(triethyl phosphite) nickel, tetrakis [tri(4-methyl phenyl) phosphite] nickel, tris [tri(2-methoxyethyl) phosphite] nickel carbonyl, [tri(4-chloro phenyl)phosphite] nickel tricarbonyl, bis [tri(4-ethoxy phenyl)phosphite]-bis [tri(2-ethoxy ethyl) phosphite] nickel and tris [tri(4-chloro phenyl) phosphite] nickel carbonyl. An especially preferred class of nickel complexes is exemplified by the nickel carbonyls complexes of the preceding empirical formula in which the electron donor molecule L is a trialkyl or triaryl ester of phosphorus, arsenic or antimony in which each hydrocarbyl group contains from 1 to about 10 carbon atoms.

The nickel coordination complexes of this invention may be used alone or in combination and are often advantageously employed in the presence of an activator selected from the group consisting of metals of Groups I–A, II–A, II–B, III–A and IV–A, as well as hydride and organo metallic compounds of said metals. Among the metals useful as activators according to this invention are lithium, sodium, potassium, beryllium, magnesium, calcium, strontium, barium, zinc, cadmium, mercury, aluminum, gallium, indium, germanium, tin and lead. Representative hydride and organo metallic compounds of these suitable metals include lithium hydride, sodium hydride, calcium hydride, aluminum hydride, n-butyl lithium, allyl sodium, phenyl sodium, diethyl calcium, tetraethyl lead, trimethyl aluminum, diethyl aluminum hydride, ethyl aluminum dichloride, and phenyl magnesium bromide. A preferred group of activators is represented by aluminum compounds of the formula

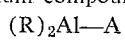

$(R)_2 Al—A$ wherein R is a hydrocarbyl group having up to about 20 carbon atoms and A is selected from the group consisting of R, H, chloride and lower hydrocarboxy radicals. Examples of such preferred compounds include triphenyl aluminum, tri(polyethylene) aluminum compounds, ethoxy diethyl aluminum, diethyl aluminum hydride and diethyl aluminum chloride. Trialkyl aluminum compounds such as triethyl aluminum and triisobutyl aluminum represent an especially preferred group of activators.

When these activators are used in the process of this invention, they can be employed in a molar ratio of activator metal to nickel from as high as 50 to 1 to as low as 0.1 to 1. It is usually desirable, however, to employ them in a molar ratio of activator to nickel of from about 25 to 1 to about 0.25 to 1, and particularly, from about 12 to 1 to about 1 to 1.

Although the addition of a pure stable nickel (0) coordination catalyst to the reaction system minimizes process equipment requirements and offers other advantages as described above, greater economy of operation can often be achieved in the process of this invention, as in the prior art conjugated diene homooligomerization reactions, by utilizing a suitable nickel complex in impure form, such as in admixture with by-products and unreacted components of its synthesis. Suitable synthesis mixtures of this type can be prepared by a variety of well known procedures, as exemplified by U.S. Patent 3,152,158 and U.S. applications S.N. 129,968 and S.N. 202,406, the disclosures of which are incorporated herein by reference.

Illustration of such procedures is the production of a synthesis mixture of tetrakis (trihydrocarbylphosphite) nickel as disclosed in U.S. Patent 3,152,158 i.e. by the interaction of a molar excess of trihydrocarbyl phosphite with an organo nickel compound (a compound having a carbon to nickel bond) such as bis(cyclopentadienyl) nickel picrate, bis(indenyl) nickel or bis(cyclooctadiene) nickel.

Another known method of producing suitable synthesis mixtures is by the interaction, either in situ in the reaction system or externally, of a readily available and relatively inexpensive nickel (II) or nickel (III) compound with a reducing agent and a molecular organic Lewis base, as illustrated by United States applications S.N. 129,968 and S.N. 202,406. Employment of the reaction products of this general method offers an additional advantage in that it facilitates the use in the cooligomerization reaction of this invention of nickel coordination complexes with any molecular organic Lewis base (as described above) include those which would not otherwise be practicable because of instability of the pure complex at room temperature and atmospheric pressure or other factors which might adversely affect its isolation from a synthesis mixture. Examples of such synthesis mixtures of otherwise impracticable complexes include those in which the added molecular Lewis base is an amine, such as triphenylamine, pyridine or aniline, or an ethylenically unsaturated lower aliphatic hydrocarbon, such as 1,3-butadiene. Any nickel (II) or nickel (III) compound can be used with a reducing agent in the preparation of these suitable synthesis mixtures. Examples of such compounds include salts of inorganic acids, such as nickel bromide and nickel nitrate; salts of carboxylic acids, such as nickelacetate and nickel naphthenate; complexes of nickel salts, such as bis(triphenylphosphine) nickel bromide; and compounds of organic chelating agents, such as acetylacetone and dimethylglyoxime. Similarly, any reducing agent may be used which can lower the valence of nickel to less than 2; including any of the materials disclosed hereinabove as suitable activators in the process of this invention as well as hydrogen, hydrazines and boron hydrides and hydrocarbyls.

The foregoing methods of preparing non-discrete nickel coordination complexes do not constitute the essence of the instant invention, but are set forth merely to illustrate the applicability of the nickel complex containing reaction products in the process of the instant invention.

In carrying out the process of this invention, the concentration of nickel complex can be varied over wide range. Although as little as about 0.001% (by weight of nickel based on the weight of diolefin) can be used, as can concentration of 10% or higher, in general it is preferable to use from about 0.5% to about 3% nickel in batch operations. In continuous operation, the nickel concentration is advantageously somewhat higher; i.e. from about 1% to about 6%.

When the nickel coordination complexes of this invention are used in conjunction with an activator or are produced by the reduction of a nickel (II) or nickel (III) compound with a Ziegler type reducing agent, it is essential that precautions be taken to protect the reaction mixture from excessive quantities of water, alcohol, carbon dioxide, oxygen and other materials which are known to be reactive with these activators and reducing agents. Small quantities of such reactive impurities are of course tolerable; however, it is preferred that they be essentially excluded in order to achieve maximum efficiency of the cooligomerization process.

The use of an inert reaction medium is not essential to the conduct of the process of this invention; however, it is often advantageous to utilize a solvent for the nickel coordination complex. Suitable solvents include saturated or non-conjugated aliphatic and cyclo aliphatic hydrocarbons, aryl and alkaryl hydrocarbons, and ring halogenated aryl and alkaryl hydrocarbons, preferably containing from about 5 to about 10 carbon atoms. Illustrative of such suitable solvents are n-hexane, isooctane, cyclohexane, cyclopentadiene, 1,5-cyclooctadiene, 1,5-cyclodecadiene, 1,5,9-cyclododecatriene, benzene, toluene, chlorobenzene and p-chlorotoluene. The aryl and alkaryl hydrocarbons are particularly preferred.

The following examples are illustrative of the process of the instant invention.

EXAMPLE I

A clean dry 300 ml. stainless steel autoclave equipped with a magnetic stirrer is flushed with argon evacuated and charged successively with one gram of bis(triphenylphosphite) nickel dicarbonyl, forty grams of 1,3-butadiene and forty-eight grams of ethylene. Stirring is then initiated and the temperature of the mixture raised from 24° C. to 149° C. in thirty-four minutes. During this period the pressure within the autoclave rises from 410 p.s.i.g. to 1000 p.s.i.g. Heating is then terminated and the autoclave cooled to 40° C. over a two hour period. At this point, unreacted gases are vented and the reaction mixture filtered. The components of the liquid reaction product that can be identified by chromatographic and infrared spectrographic analyses are 1,5-cyclooctadiene, 4-vinylcyclohexene, 1,5-cyclodecadiene, 1,2-divinylcyclohexane, 1,4,9-decatriene and 1,5,9-cyclododecatriene. The yield of $C_{10}$ cooligomers is 5.9 grams.

EXAMPLES II–VIII

In each of Examples II–VIII, a clean dry 300 ml. autoclave equipped with a magnetic stirrer is flushed with nitrogen at atmospheric pressure and charged successively with 0.01 mole of nickel complex (Column A in Table I) in thirty ml. of solvent (Column B), forty grams of 1,3-butadiene, 0.08 mole of reducing agent (Column C) and forty-two grams of ethylene. Stirring is commenced and the temperature of the reaction mixture raised rapidly to 120° C. The temperature is maintained at 120° C. (±5° C.) for ninety minutes, at which point the autoclave is allowed to cool to room temperature. After venting unreacted gases, twenty ml. of methanol is added to the autoclave and the contents are filtered. Qualitative vapor phase chromatographic analysis of the filtrate shows, in each instance, the presence of cooligomers containing ten carbon atoms.

TABLE I

| Example | A | B | C |
|---|---|---|---|
| II | Nickel carbonyl | Cyclohexane | Diisobutyl aluminum hydride. |
| III | Tri(2-ethylhexyl)phosphite nickel tricarbonyl | Benzene | Phenyl magnesium bromide. |
| IV | Bis(triphenylantimonite) nickel dicarbonyl | n-Hexane | Diethyl aluminum chloride. |
| V | Bis(triphenylphosphine) nickel dicarbonyl | Benzene | Ethoxy diethyl aluminum. |
| VI | Tris(triphenylphosphite) nickel carbonyl | Toluene | n-Butyl lithium. |
| VII | Tetrakis (triphenylphosphite) nickel | Benzene | |
| VIII | Bis(cyclooctadiene) nickel | 1,5-cyclooctadiene | |
| IX | Bis(triphenylstilbine) nickel dicarbonyl | Chlorobenzene | Triethylaluminum. |
| X | Tris[tri(p-tolyl)phosphite] nickel icarbonyl | Benzene | Do. |
| XI | Tris(triphenylphosphite) triphenyl phosphine nickel | do | |

EXAMPLE XII

A mixture of 0.35 mole of triphenylphosphite, 0.03 mole of bis(cyclopentadienyl) nickel and ninety ml. of benzene is stirred at 60° C. under a blanket of argon in a 500 ml. flask for one hour. Sixty ml. of the benzene solution is then withdrawn and tetrakis(triphenylphosphite) nickel recovered by vacuum, stripping the benzene and washing the crude product with methanol. The thirty ml. of synthesis solution remaining in the flask are then substituted for the pure nickel complex and solvent in the process of Example VII to produce linear and cyclic cooligomers of butadiene and ethylene.

EXAMPLE XIII

The process of Example VII is repeated using a mixture of 0.1 mole of triphenylphosphite and 0.01 mole of bis(indenyl) nickel in place of pure tetrakis(triphenylphosphite) nickel to produce cooligomer product.

EXAMPLES XIV-XX

In each of Examples XIV-XX, which demonstrate the effect of pressure variations, the following procedure is used.

A clean dry glass lined autoclave equipped with a magnetic stirrer is purged with argon for five minutes and charged with one gram of triphenylarsine nickel tricarbonyl and thirty grams of dry benzene. The quantities of 1,3-butadiene and ethylene shown in Table II are then introduced and stirring is commenced as the reaction temperature is rapidly raised to 60° C. After twenty-four hours at this temperature, the autoclave is cooled to room temperature, vented and its contents filtered. Liquid reaction product is then isolated by vacuum distillation.

the reactor temperature is allowed to drop from 60° C. to room temperature and the unreacted gases are withdrawn and analyzed. Ethylene recovery is substantially quantitative.

EXAMPLE XXII

A clean dry 300 ml. glass lined autoclave equipped with a magnetic stirrer is charged with one gram of bis(triphenylarsine) nickel dicarbonyl and twenty ml. of benzene. The autoclave is then flushed with ethylene, sealed and three grams of triisobutyl aluminum in fifteen ml. of benzene are added. After stirring the reactor contents for twenty minutes, 54 grams of 1,3-butadiene are introduced and the autoclave pressurized with ethylene to 325 p.s.i.g. The temperature is raised to and maintained at 60° C. for seventeen hours. The autoclave is then allowed to cool to room temperature, unreacted gases are vented and twenty ml. of aqueous phosphoric acid is added to deactivate any remaining aluminum alkyl. Following removal of the aqueous phase, vacuum distillation of the reaction mixture yields 32.4 g. of liquid cooligomers of the empirical formula $C_{10}H_{16}$ (predominately 1,5-cyclodecadiene and 1,4,9-decatriene), 18.5 g. of liquid homooligomers of butadiene (predominately 1,5-cyclooctadiene and 1,5,9-cyclododecatriene) and 9.6 g. of non-volatile butadiene polymer.

EXAMPLES XXIII-XXX

The following general procedure is used in Examples XXIII-XXX.

A clean dry 300 ml. stainless steel autoclave equipped with a magnetic stirrer is evacuated and then charged with thirty ml. of dry benzene and four grams of 1,3-butadiene. Stirring is commenced and the nickel com-

TABLE 2

| Example | Monomer Charge | | Mol ratio butadiene: ethylene | Initial pressure at 60° C. (p.s.i.g.) | Final pressure at 60° C. (p.s.i.g.) | Theoretical yield 2 Butadiene/ Ethylene Cooligomers (g.) | Actual Yield 2 Butadiene/ Ethylene Cooligomers (g.) | Cooligomer Yield percent theory |
|---|---|---|---|---|---|---|---|---|
| | 1,3-butadiene (g.) | Ethylene (g.) | | | | | | |
| XIV | 27 | 28 | 1:2 | 500 | 480 | 34 | 16.6 | 48.8 |
| XV | 54 | 14 | 2:1 | 300 | 160 | 68 | 35 | 51.5 |
| XVI | 54 | 7 | 4:1 | 190 | 115 | 34 | 15.2 | 47.8 |
| XVII | 54 | 7 | 4:1 | ¹ 400 | 400 | 34 | 18.4 | 54.1 |
| XVIII | 54 | 2.8 | 10:1 | 145 | 90 | 13.6 | 7.4 | 54.4 |
| XIX | 54 | 2.1 | 15:1 | 104 | 73 | 10.2 | 1.7 | 16.7 |
| XX | 54 | 1.7 | 20:1 | 75 | 50 | 7.1 | (²) | <1 |

¹ Autoclave pressure maintained at 400 p.s.i.g. with nitrogen.  ² Trace (<8 mg.).

EXAMPLE XXI

The process of Example XV is repeated under a reactor pressure of 0-5 p.s.i.g. by introducing the gaseous mixture of butadiene and ethylene beneath the surface of the liquid benzene solvent through a fritted glass disc. The vapor space above the solvent is continuously vented into an external reservoir which is maintained at reaction temperature and from which unreacted gases are recycled to the reactor through the fritted glass disc. The gas flow rate through the fritted disc is maintained at between thirty and fifty liters per hour. After twenty-four hours, pound, electron donor and reducing agent (all as shown in Table 3) are successively introduced. The autoclave is then pressured to 300 p.s.i.g. with ethylene and brought rapidly to reaction temperature, which is maintained for a specified time. During this reaction period, additional ethylene is introduced when necessary to maintain total reactor pressure above 300 p.s.i.g. At the end of the reaction period, the autoclave is rapidly cooled and vented and twenty ml. of isopropanol are added to deactivate the catalyst. Reaction products are separated by vacuum distillation and analyzed.

TABLE 3

| Example | XXIII | XXIV | XXV | XXVI | XXVII |
|---|---|---|---|---|---|
| Ni compound (0.01 mole) | Nickel napthenate | Nickel acetylacetonate | Nickel acetylacetonate | Nickel benzoylacetonate | Nickel acetylacetonate |
| Electron donor (quantity) | | | Diphenyl hydrogen phosphite (0.04 mole) | Triphenyl phosphine (0.04 mole) | Piperidine (0.03 moles) |
| Reducing Agent | Triethyl aluminum | Triethyl aluminum | Ethoxydiethyl aluminum | Ethoxydiethyl aluminum | Triethyl aluminum |
| Al:Ni molar ratio | 4 | 4 | 2 | 2 | 4 |
| Temp. (°C.) | 60 | 25 | 45 | 40 | 50 |
| Time (hrs.) | 7 | 22 | 4 | 20 | 5 |
| Butadiene conversion (wt. percent) | 88 | 93 | 48 | 100 | 50 |
| Selectivity, wt. percent of liquid and solid product: | | | | | |
| Cyclooctadiene and Vinylcyclohexene | (a) | (a) | 46.4 | 43.0 | (a) |
| n-Decatriene | 32.0 | 6.1 | (a) | (a) | 24.5 |
| Cyclodecadiene | 35.0 | 25.2 | 35.4 | 44.5 | 32.8 |
| Cyclododecatriene | 22.4 | 32.9 | 2.6 | 6.4 | 31.8 |
| Non-Volatile | 7.2 | 11.2 | 18.2 | 5.2 | 7.7 |

| Example | XXVIII | XXIX | XXX | XXXI | XXXII |
|---|---|---|---|---|---|
| Ni compound (0.01 mole) | Nickel acetyl acetonate | Nickel bromide | (Propylene diamine) nickel acetylacetonate | Nickel ethyl trifluoroacetoacetate | Nickel acetylacetonate |
| Electron donor (quantity) | | | | | Triphenylamine (0.03 mole) |
| Reducing Agent | Diisobutyl aluminum hydride | Triethyl aluminum | Triethyl aluminum | Triethyl aluminum | Ethoxy diethyl aluminum |
| Al:Ni molar ratio | 4 | 5 | 5 | 5 | 2 |
| Temp. (°C.) | 60 | 80 | 50 | 50 | 40 |
| Time (hrs.) | 4 | 6 | 5 | 6 | 18 |
| Butadiene conversion (wt. percent) | 90 | 85 | 91 | 86 | 93 |
| Selectivity, wt. percent of liquid and solid product: | | | | | |
| Cyclooctadiene and Vinylcyclohexene | (a) | (a) | (a) | (a) | (a) |
| n-Decatriene | 23.0 | (a) | 58.0 | 49 | 24.5 |
| Cyclodecadiene | 53.0 | (a) | 11.1 | 24 | 47.9 |
| Cyclododecatriene | 20.2 | 42 | 17.0 | 12 | 24.8 |
| Non-Volatile | 3.7 | | 7.5 | 11 | 2.5 | a Positive qualitative identification.

I claim:

1. In a process for oligomerizing a conjugated aliphatic diolefin having from 4 to about 9 carbon atoms with a nickel (0) coordination catalyst and recovering the resulting oligomer product, the improvement comprising contacting said catalyst with a liquid admixture of said diolefin and ethylene at a temperature of from about 0° C. to about 150° C.

2. The process of claim 1 wherein said diolefin is 1,3-butadiene.

3. The process of claim 1 wherein said catalyst is a complex of nickel (0) with said diolefin.

4. The process of claim 1 wherein said catalyst is produced by contacting said diolefin in liquid phase with a molecular organic Lewis base complex of nickel (0).

5. The process of claim 1 wherein said catalyst is produced by contacting said diolefin in liquid phase with a nickel complex of the formula $$(L)_n Ni(CO)_{4-n}$$

wherein L is an ester of a trivalent Group V–A element having an atomic weight of from about 30 to about 209 and $n$ is an integer from 0 to 4 inclusive.

6. The process of claim 5 wherein L is an organic electron donor molecule selected from the group consisting of trihydrocarbyl esters of phosphorus, arsenic and antimony.

7. The process of claim 6 wherein $n$ is from 1 to 3 inclusive.

8. The process of claim 6 wherein $n$ is 4.

9. The process of claim 8 wherein said complex of nickel is produced by contacting a trihydrocarbyl phosphite with an organo nickel compound.

10. The process of claim 8 wherein said nickel complex is produced by contacting said electron donor molecule with an organo nickel compound in the presence of an activator selected from the group consisting of metals of Groups I–A II–A, II–B, III–A and IV–A and hydride and organo metallic compounds of said metals.

11. The process of claim 1 where in said catalyst is produced by contacting said diolefin in liquid phase with a nickel (0) carbonyl complex in the presence of an activator selected from the group consisting of metals of Groups I–A, II–A, II–B, III–A and IV–A and hydride and organometallic compounds of said metals.

12. The process of claim 1 wherein said catalyst is produced by contacting said diolefin in liquid phase with a reduced nickel compound obtained by admixing a nickel compound selected from the group consisting of nickel (II) and nickel (III) compounds with a reducing agent selected from the group consisting of hydrogen, a hydrazine, metals of Groups I–A, II–A, II–B, III–A and IV–A and hydride and organometallic compounds of said metals and boron.

13. In a process for oligomerizing 1,3-butadiene with a molecular organic Lewis base complex of nickel (0) and recovering the resulting oligomer product, the improvement comprising contacting said complex with a liquid admixture of said butadiene and ethylene at a temperature of from 0° C. to about 150° C.

14. The process of claim 13 wherein said nickel complex is of the formula $$(L)_n Ni(CO)_{4-n}$$

wherein L is a molecular ester of a trivalent Group V–A element having an atomic weight of from about 30 to about 209 and $n$ is an integer from about 0 to 4 inclusive.

15. The process of claim 14 wherein L is selected from the group consisting of trihydrocarbyl esters of phosphorus, arsenic and antimony.

16. The process of claim 14 wherein L is a trihydrocarbyl phosphite.

17. The process of claim 14 wherein L is a trihydrocarbyl arsine.

18. The process of claim 13 wherein said nickel complex is admixed with an activator of the formula $$(R)_2 Al - A$$

wherein R is a hydrocarbyl group having up to about 20 carbon atoms and A is selected from the group consisting of R, H, chloride and lower hydrocarboxy radicals.

19. In a process for oligomerizing a conjugated aliphatic diolefin with a nickel (0) complex obtained by admixing a nickel compound selected from the group consisting of nickel (II) and nickel (III) compounds with a reducing agent selected from the group consisting of hydrogen, hydrazines, metals of Groups I–A, II–A, II–B, III–A and IV–A and hydride and organo metallic compounds of said metals and boron and recovering the resulting oligomer product, the improvement comprising contacting said complex with a liquid admixture of said diolefin and ethylene at a temperature of from 0° C. to about 150° C.

20. The process of claim 19 wherein said nickel compound and said reducing agent are admixed in contact with at least about four moles of molecular organic Lewis base per mole of said nickel compound.

21. The process of claim 19 wherein said nickel compound is a nickel (II) salt and said reducing agent is an aluminum alkyl.

References Cited

UNITED STATES PATENTS

| 3,349,138 | 10/1967 | Larson et al. | 260—666 |
| 3,379,706 | 4/1968 | Wilke | 260—943 |
| 3,277,099 | 8/1966 | Seiby | 260—666 |
| 3,004,081 | 10/1961 | Bosmajian | 260—666 |
| 3,187,062 | 6/1965 | Shechter | 260—666 |
| 3,249,641 | 5/1966 | Storrs et al. | 260—666 |
| 3,270,071 | 8/1966 | Mueller | 260—666 |
| 3,271,468 | 9/1966 | Wilke et al. | 260—666 |
| 3,272,876 | 9/1966 | Levine | 260—666 |
| 3,326,990 | 6/1967 | Clark | 260—666 |

DELBERT E. GANTZ, *Primary Examiner.*

V. O'KEEFE, *Assistant Examiner.*

U.S. Cl. X.R.

260—439